United States Patent
Hinkston

[15] 3,670,935
[45] June 20, 1972

[54] COLLAPSIBLE CYCLE CARRIER

[72] Inventor: Paul R. Hinkston, 10723 Cushdon Avenue, Los Angeles, Calif. 90064

[22] Filed: Nov. 9, 1970

[21] Appl. No.: 87,952

[52] U.S. Cl. ..................................................224/42.03 B
[51] Int. Cl. ..........................................................B62d 43/00
[58] Field of Search ..............224/42.03 B, 42.03 A, 42.03 R, 224/42.08, 42.04, 42.05, 42.06, 42.07

[56] References Cited

UNITED STATES PATENTS

| | | | |
|---|---|---|---|
| 3,529,737 | 9/1970 | Daugherty | 224/42.08 X |

FOREIGN PATENTS OR APPLICATIONS

| | | | |
|---|---|---|---|
| 79,713 | 9/1950 | Norway | 224/42.08 |
| 854,484 | 1/1940 | France | 224/42.03 B |

Primary Examiner—Gerald M. Forlenza
Assistant Examiner—Jerold M. Forsberg
Attorney—Flam & Flam

[57] ABSTRACT

A collapsible cycle carrier for an automobile or like vehicle. The carrier comprises a pair of support arms pivotally connected to opposite ends of a channel bar, and a crossbar which extends between the free ends of the support arms when the arms are set upright for cycle carriage. A bicycle may be supported on cycle hooks extending from the support arms. Vehicle bumper attachment members extend rearwardly from the channel bar. Stability of the carrier is insured by appropriate support arm rotation limiting means attached to the channel bar. To collapse the cycle carrier, the crossbar arm is detached from one support arm, swung into alignment with the other arm to which it is pivotally connected, and the support arms and crossbar folded into the channel bar.

13 Claims, 8 Drawing Figures

PATENTED JUN 20 1972 3,670,935
SHEET 1 OF 2
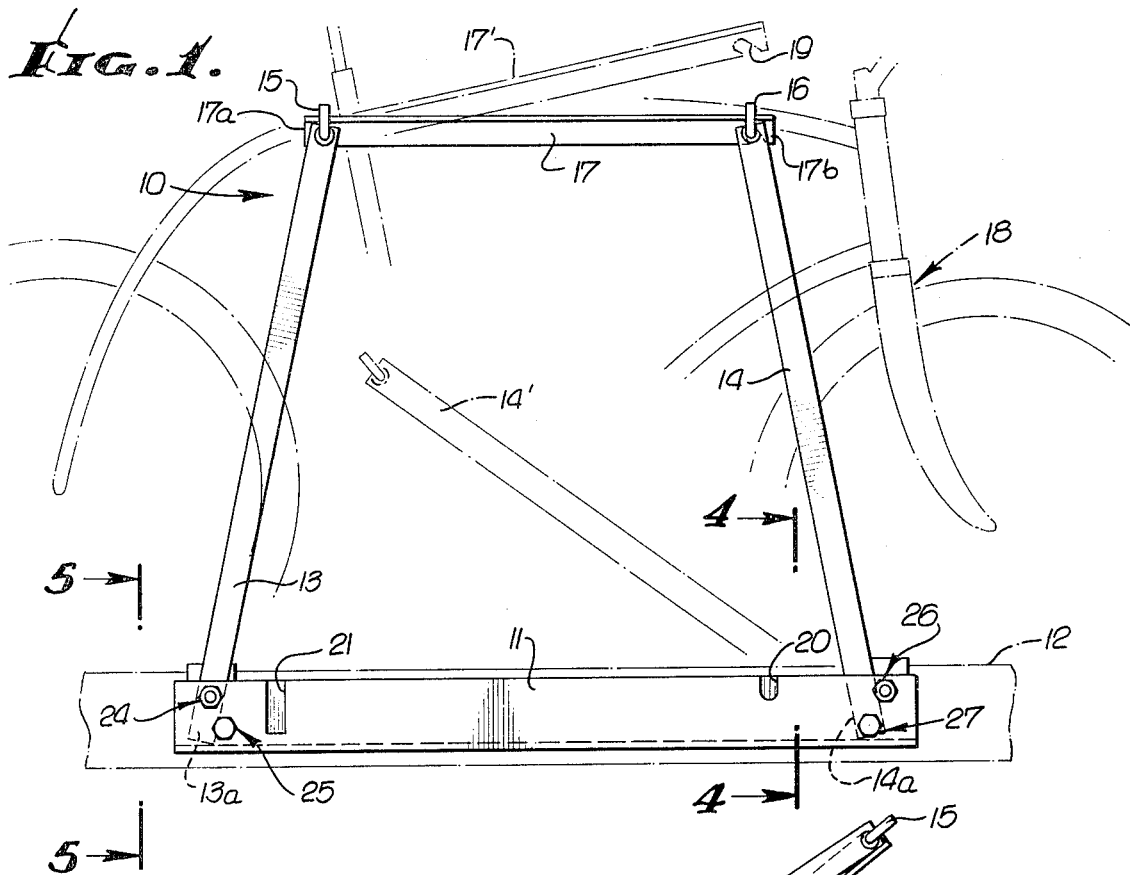
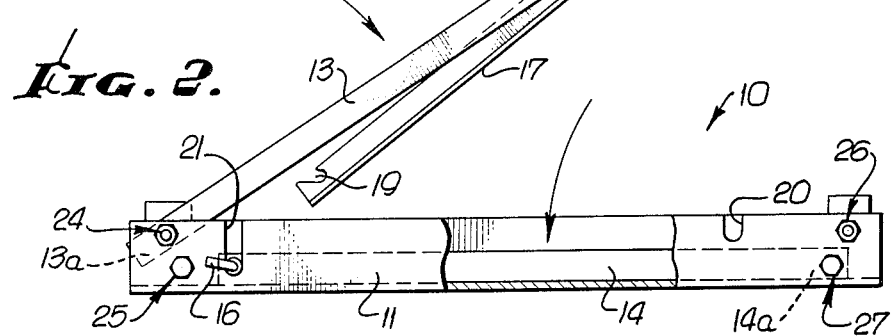
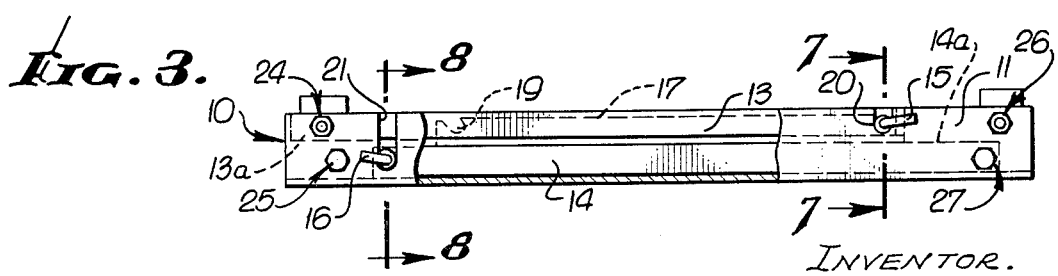
INVENTOR.
PAUL R. HINKSTON
BY Flam and Flam
ATTORNEYS.

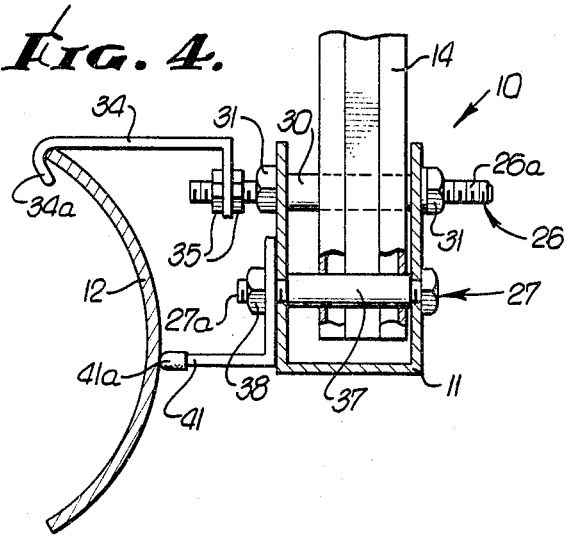
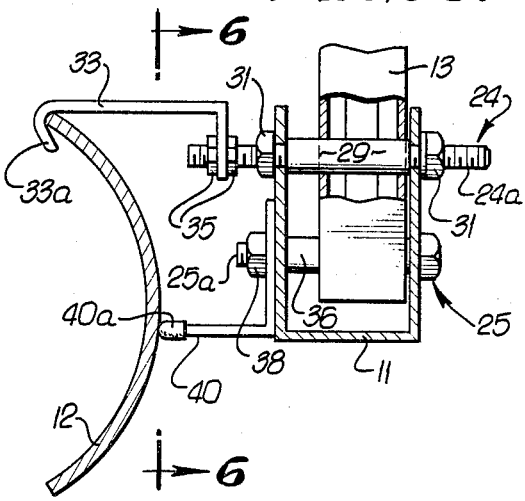
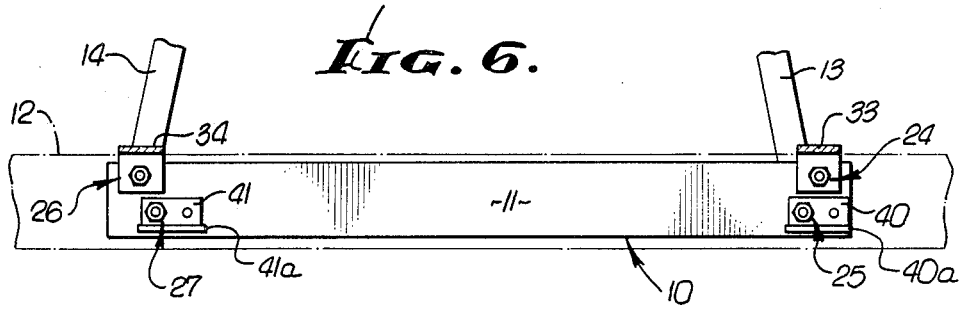
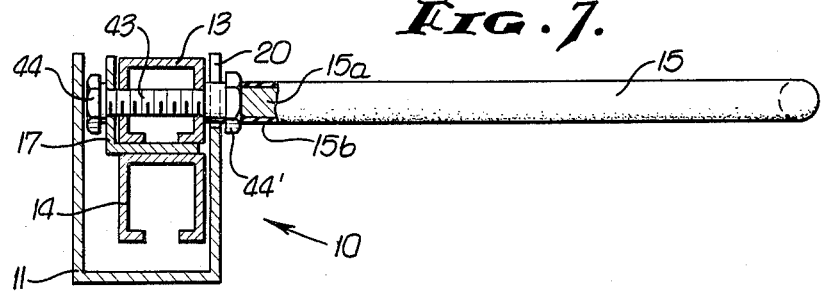
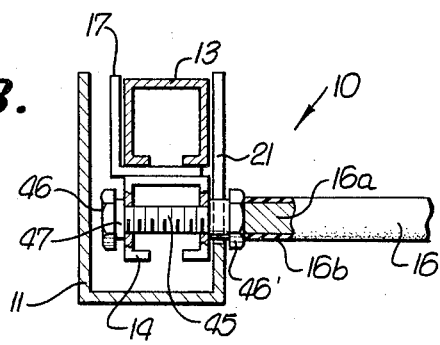

COLLAPSIBLE CYCLE CARRIER

BACKGROUND OF THE INVENTION

1. Field of the Invention.

The present invention relates to a collapsible cycle carrier. More particularly, the invention relates to a cycle carrier comprising a channel bar attachable to a vehicle, and including support members which may be stored within the channel bar and which pivot upward therefrom into a stable, cycle-supporting configuration.

2. Description of the Prior Art.

To enhance their cycling pleasure, bicycle and small power motorcycle enthusiasts find it advantageous occasionally to transport their cycles by automobile to a distant location, there to enjoy new scenery while cycling or perhaps to engage in a cycling contest. Since a bicycle or motorcycle will not readily fit into the trunk of an automobile, various schemes have been derived for attaching a cycle to the exterior of the automobile.

While a bicycle may be tied to a roof-top luggage rack, this approach is unsatisfactory because of the difficulty of hoisting the cycle to the automobile roof. More satisfactory is the use of a cycle rack attached to the rear of a vehicle. A number of such racks have been available in the past, but all suffer common shortcomings. Typically, such prior art racks comprise a generally rectangular steel frame, bolted or otherwise rigidly connected to the automobile. Such racks are not collapsible, but remain set up even when not in use. Because of the difficulty in detaching such racks from the vehicle, the owner often chose to tolerate the unsightliness of the rack rather than bother disconnecting it when not in use.

Another limitation of such prior art bicycle racks is their instability. Typically, the upright frame members tended to sway from side to side when the vehicle was in motion. If the frame members were bolted together, this instability increased as the bolts loosened, thus requiring periodic tightening of the rack. Although the instability could be eliminated by welding together the frame members, this solution precluded simple disassembly or folding of the rack.

These and other shortcomings of the prior art are overcome by using the inventive collapsible cycle carrier which may simply and readily be attached to or removed from the bumper of a vehicle. The carrier is collapsible, with the upright support members folding neatly into an unobtrusive package when not in use. Moreover, when set up for cycle carriage, the unique construction prevents side-to-side instability without requiring a welded frame or periodic retightening of bolts.

BRIEF SUMMARY OF THE INVENTION

In accordance with the present invention, there is provided a collapsible cycle carrier adapted for attachment to the bumper of an automobile or like vehicle. The carrier comprises a channel bar provided with appropriate brackets for attachment to a vehicle bumper. A frame, comprising a pair of support arms spaced by a crossbar, extends upwardly from the channel bar to support a bicycle. When not in use, the support arms and crossbar pivot to a folded position completely within the channel bar.

In a preferred embodiment, the carrier comprises first and second support arms pivotally attached to opposite ends of the channel bar. The crossbar itself is pivotally attached to the free end of one support arm, and is detachably connectable to the free end of the other support arm. A pair of cycle hooks project from the top of the support arms to engage the cycle frame.

Appropriate shaft members are provided transverse of the channel bar to limit clockwise rotation of one support arm and counter-clockwise rotation of the other support arm. As a result, when the support arms and crossbar are set up for cycle carriage, the shaft members completely prevent side-to-side motion or instability of the frame. A simple bumper hook and bumper rest arrangement facilitates attachment of the cycle carrier to the automobile bumper.

Thus, it is an object of the present invention to provide an improved collapsible cycle carrier.

Another object of the present invention is to provide a cycle carrier for an automobile or like vehicle, including a stable cycle-supporting rack which readily may be folded into an unobtrusive package when not in use.

A further object of the present invention is to provide a cycle carrier comprising a channel bar attachable to a vehicle, a pair of cycle support arms pivotally connected to the channel bar, and a crossbar which extends between the support arms when set up for cycle carriage; for storage, the crossbar and support arms all pivot into a collapsed position completely within the channel bar.

BRIEF DESCRIPTION OF THE DRAWINGS

Detailed description of the invention will be made with reference to the accompanying drawings wherein like numerals designate like parts in the several figures. These drawings, unless described as diagrammatic or unless otherwise indicated, are to scale.

FIG. 1 is a front elevation view of a collapsible cycle carrier in accordance with the present invention. The carrier is shown attached to a vehicle bumper and supporting a bicycle.

FIGS. 2 and 3 are front elevation views of the cycle carrier of FIG. 1, shown respectively in the partly folded and completely folded configurations.

FIGS. 4 and 5 are transverse sectional views, as seen respectively along the lines 4—4 and 5—5 of FIG. 1, showing vehicle bumper attachment features of the cycle carrier.

FIG. 6 is a fragmentary rear elevation view, partly in section, of the inventive cycle carrier as seen along the line 6—6 of FIG. 5.

FIGS. 7 and 8 are transverse sectional views of the inventive cycle carrier, as seen respectively along the lines 7—7 and 8—8 of FIG. 3, showing the cycle hooks, support arms and crossbar folded within the channel bar.

DESCRIPTION OF THE PREFERRED EMBODIMENT

The following detailed description is of the best presently contemplated mode of carrying out the invention. This description is not to be taken in a limiting sense but is made merely for the purpose of illustrating the general principles of the invention since the scope of the invention is best defined by the appended claims.

Referring now to the drawings, and particularly to FIG. 1 thereof, there is shown a collapsible cycle carrier 10 in accordance with the present invention. Carrier 10 includes a channel bar 11 which may be attached to the bumper 12 of an automobile or like vehicle. Pivotally connected to channel bar 11 are a pair of cycle support arms 13, 14 each having a cycle hook 15, 16 at its upper end. A crossbar 17 extends between support arms 13, 14 when carrier 10 is set up as shown in FIG. 1, thereby facilitating carriage on hooks 15, 16 of a bicycle 18, small motorcycle or the like.

Cycle carrier 10 is collapsible so that when not in use, support arms 13, 14 and crossbar 17 may be stored within channel bar 11 as shown in FIG. 3. To facilitate such storage, support arms 13, 14 preferably are of rectangular cross-section, with crossbar 17 of L-shaped cross-section. One end 17a of crossbar 17 is pivotally connected to support arm 13, and the other end 17b is provided with a slot 19 for connection to a projecting portion of cycle hook 16 on support arm 14.

Crossbar 17 may be detached from support arm 14 and rotated to the position shown in phantom at 17' in FIG. 1. Such detachment permits support arm 14 to be rotated through the position shown in phantom at 14' to the collapsed position (FIGS. 2 and 3) completely within channel bar 11. Crossbar 17 then may be rotated into alignment with support arm 13, for simultaneous rotation (as indicated generally in FIG. 2) to the collapsed position (FIG. 3) within channel bar 11. Note that a pair of slots 20 and 21 are provided in a side of channel bar 11 to receive cycle hooks 15, 16 as arms 13 and 14 are folded into the channel bar.

To prevent side-to-side motion of support arms 13 and 14 when cycle carrier 10 is set up as shown in FIG. 1, the ends of channel bar 11 are provided with respective pairs 24, 25 and 26, 27 of transverse shaft members. The lower end 13a of support arm 13 is pivotally connected to, but extends beyond shaft member 24. Counter-clockwise rotation of support arm 13 (as viewed in FIG. 1) is limited by contact of end 13a against shaft member 25, which member is disposed below and to the right of shaft member 24. Similarly, the lower end 14a of support arm 14 is pivotally connected to lower shaft member 27. Clockwise rotation of support arm 14 (as viewed in FIG. 1) thus is limited by shaft member 26, which member is situated above and to the right of shaft member 27.

When crossbar 17 is connected as shown in solid in FIG. 1, support arms 13, 14 and crossbar 17 are prevented by shaft members 25 and 26 from moving either toward the left or toward the right. This insures rigid stability of cycle carrier 10 when set up for carriage of bicycle 18. Note that pivotal connection of support arm 13 to upper shaft member 24 and of support arm 14 to lower shaft member 27 also accommodates the stacked storage configuration within channel bar 11 shown in FIG. 3.

Details of shaft members 24, 25, 26 and 27 are illustrated in FIGS. 4 and 5. As seen therein, shaft members 24, 26 each comprise a threaded shaft 24a, 26a of length greater than the width of channel bar 11. Shafts 24a, 26a extend transversely across channel bar 11, surrounded by respective thread-protecting collars 29 and 30, and are maintained in place by nuts 31. Shaft 24a and collar 29 also extend transversely through and provide pivotal connection to support arm 13. A pair of angled bumper hooks 33, 34 are attached to the rearwardly projecting portions of respective shafts 24a, 26a by means of nuts 35.

Still referring to FIGS. 4 and 5, shaft members 25, 27 respectively comprise hex-headed bolts 25a, 27a each of length greater than the width of channel 11. Bolts 25a, 27a extend transversely across channel bar 11, surrounded by respective collars 36, 37 and are maintained in place by nuts 38. Nuts 38 also retain respective bumper rests 40, 41. Note that bolt 26a and collar 30 extend through and provide pivotal connection to support arm 14.

Attachment of cycle carrier 10 to vehicle bumper 12 is illustrated in FIGS. 4, 5 and 6. As illustrated therein, the hooked edges 33a, 34a of respective bumper hooks 33, 34 engage the upper edge of bumper 12, while the padded edges 40a, 41a of respective bumper rests 40, 41 press against the convex surface of bumper 12. Nuts 35 on threaded shafts 24a, 26a may be used to adjust the effective length of bumper hooks 33, 34 until support members 13, 14 project vertically, or at a slight angle toward the vehicle. Although not shown, any combination of S-hooks, chain and turn buckles may be used to secure cycle carrier 10 to bumper 12 once this adjustment has been made. For bumpers of greater height, bumper rests 40, 41 may be replaced with appropriate rods and/or brackets so as to engage the larger bumper below the apex thereof.

Referring now to FIG. 7, it may be seen that cycle hook 15 comprises a rod 15a of steel or like material covered with a plastic or rubber protective coating 15b. Rod 15a is fixedly attached to, and projects coaxially from a threaded shaft 43 extending through support arm 13 and crossbar 17 and retained by appropriate fasteners 44, 44'. This arrangement simultaneously facilitates attachment of cycle hook 15 to support arm 13 and pivotal connection between support arm 13 and crossbar 17. Note that when folded into channel bar 11, support arm 13 seats "within" the L-shaped cross-section of crossbar 17. Support arm 13, crossbar 17, shaft 43 and fitting 44 are appropriately dimensioned to fit within channel bar 11 when cycle carrier 10 is collapsed.

FIG. 8 illustrates the manner in which cycle hook 16 may be attached to support arm 14. Specifically, cycle hook 16 also comprises a rod 16a of steel or like material covered with a rubber or plastic protective coating 16b. Rod 16a is fixedly attached to, and projects coaxially from a threaded shaft 45 which extends through support arm 14 and is retained thereto by fasteners 46, 46'. A collar 47 is provided between fastener 46 and support member 14 having a width greater than the thickness of crossbar 17. When cycle carrier 10 is set up as shown in FIG. 1, slot 19 of crossbar 17 engages collar 47. Support arm 14, shaft 45, fastener 46 and collar 47 are dimensioned so that all of these elements fit within channel bar 11 when cycle carrier 10 is folded for storage.

I claim:

1. A collapsible cycle carrier for an automobile or like vehicle comprising:
   an elongate channel bar horizontally attachable to said vehicle,
   first and second cycle support arms pivotally connected to opposite ends of said channel bar and each adapted to rotate from a collapsed position within said channel bar to an open position projecting generally upwardly from said channel bar,
   a crossbar having a first end pivotally connected to the free end of said first support arm, the second end of said crossbar being attachable to the free end of said second support arm, and
   means associated with said channel bar for limiting rotation of said support arms, thereby preventing motion of said support arms and crossbar when said crossbar is attached to said second support arm in said open position.

2. A cycle carrier as defined in claim 1 further comprising a cycle hook projecting from each of said support arm free ends.

3. A cycle carrier as defined in claim 2 further comprising a pair of slots in said channel bar for receiving said cycle hooks when said support arms are rotated to said collapsed position.

4. A cycle carrier as defined in claim 2 wherein said crossbar second end includes a slot adapted to engage a portion of said second support arm cycle hook.

A cycle carrier as defined in claim 2 wherein said first support arm cycle hook integrally pivotally connects said crossbar to said first support arm.

6. A cycle carrier as defined in claim 5 wherein said support arms are of generally rectangular cross-section and wherein said crossbar is of generally L-shaped cross-section.

7. A cycle carrier as defined in claim 1 wherein said means for limiting rotation comprises first and second pairs of shaft members extending transversely across said channel bar at opposite ends thereof, the shaft members of each pair being mutually horizontally and vertically offset, said support arms being respectively pivotally connected to said channel bar by the upper shaft member of one pair and the lower shaft member of the other pair, the other shaft member of each pair limiting rotation of the respective support arm.

8. A cycle carrier as defined in claim 7 wherein the end of one of said support arms is pivotally connected to and extends beyond the upper shaft member of said first pair, the lower shaft member of said first pair thereby limiting rotation in one direction of said one support arm, the other of said support arms being pivotally connected to the lower shaft member of said second pair, the upper shaft member of said second pair thereby limiting rotation in the other direction of said other support arm.

9. A cycle carrier as defined in claim 6 further comprising means connected to said shaft members for attaching said channel bar to the bumper of said vehicle.

10. A cycle carrier as defined in claim 9 wherein said means for attaching comprises a bumper hook connected to the upper shaft member of each pair and a bumper rest connected to the lower shaft member of each pair.

11. A cycle carrier as defined in claim 7 further comprising a cycle hook attached to each of said support arm free ends and corresponding cycle hook receiving slots in said channel bar.

12. A collapsible cycle carrier for an automobile or like vehicle comprising:
   an elongate channel bar,
   first and second upper shaft members extending transversely across said channel bar at opposite ends thereof, first and second lower shaft members extending transversely across said channel bar at opposite ends thereof, each offset toward the center of said channel bar with respect to a respective one of said upper shaft members, a first cycle support arm pivotally attached to said first upper shaft member, rotation of said first shaft member in one direction being limited by said first lower shaft member, and a second cycle support arm pivotally attached to said second lower shaft member, said second upper shaft member limiting rotation of said second support arm in the other direction, said support arms being pivotable from a collapsed position within said channel bar to an open position extending generally upwardly therefrom, a pair of cycle hooks attached to the free ends of said first and second support arms, and a crossbar pivotally connected to said first support arm free end by means of a shaft coaxial with one of said cycle hooks, the other end of said crossbar including a slot attachable to a coaxial portion of said second support arm cycle hook.

13. A cycle carrier as defined in claim 12 and adapted for attachment to the bumper of said vehicle, further comprising:

a pair of bumper hooks each attached to a respective one of said upper shaft members and extending rearwardly of said channel bar to engage the upper edge of said bumper, and a pair of bumper rests each attached to a respective one of said lower shaft members and extending rearwardly of said channel bar to rest against the convex surface of said bumper.

* * * * *